United States Patent [19]
Silagy

[11] Patent Number: 6,073,319
[45] Date of Patent: Jun. 13, 2000

[54] ELASTIC CORD CLOSED LOOP CONNECTOR

[76] Inventor: Howard Silagy, 100A Tec St., Hicksville, N.Y. 11801

[21] Appl. No.: 09/322,302

[22] Filed: May 28, 1999

[51] Int. Cl.[7] ............................ A43C 7/00; A43C 11/00; F16G 11/00
[52] U.S. Cl. ...................... 24/712.1; 24/712.2; 24/713.9; 24/715.3; 36/50.1
[58] Field of Search .................................. 24/712, 712.1, 24/712.2, 713.9, 714.5, 714.8, 715.3; 36/50.1

[56] References Cited

U.S. PATENT DOCUMENTS

| | | | |
|---|---|---|---|
| 1,531,410 | 3/1925 | Osterholt | 24/712.1 |
| 1,696,790 | 12/1928 | Bongiovanni | 24/712.2 |
| 3,225,402 | 12/1965 | Sltman et al. | 24/712.2 |
| 4,790,048 | 12/1988 | Arnt | 24/712.1 |
| 5,345,697 | 9/1994 | Quellais | 24/712 |
| 5,467,537 | 11/1995 | Aveni et al. | 24/712.1 |
| 5,953,800 | 9/1999 | Duckett | 24/712.1 |

*Primary Examiner*—Victor N. Sakran
*Attorney, Agent, or Firm*—Myron Amer P.C.

[57] ABSTRACT

A connector, primarily for lacing up footwear, having a finger grip which houses opposite ends of a closed loop of elastic disposed on opposite sides of a wall in the finger grip housing, and a crank pivotal into contact with one elastic loop end to hold this end and to push the wall against the other elastic loop end, so that the elastic is held as a closed loop during footwear lacing.

2 Claims, 1 Drawing Sheet

ELASTIC CORD CLOSED LOOP CONNECTOR

The present invention relates generally to a connector or clamp which unites opposite ends of an elastic cord into a closed loop which, in the loop configuration, is useful in holding spaced apart objects together, such as the spaced apart flaps bounding an opening for fitting on and taking off a sneaker or the like, and more particularly relates to improvements in the application of the clamping or holding force on the united ends of the cord.

EXAMPLES OF THE PRIOR ART

Clamps which attach to cords, shoe laces or the like, whether to produce a closed loop or merely to retain a position of attachment thereto, are well known in the patented art, as exemplified by U.S. Pat. No. 3,225,402 for "shoe lace clamp" issued to Altman et al. On Dec. 28, 1965 and U.S. Pat. No. 5,467,537 for "Shoe With Adjustable Closure System" issued to Aveni et al on Nov. 21, 1995, to mention but a few. In these and all other known prior patents, a proximal end of a clamp component is manually urged through a pivotal traverse which causes clamping contact to be established between a distal end of the component and the object being clamped, namely the cord, or shoe lace. To obtain sufficient pressure against the cord to obviate its inadvertent release from the grip of the clamp distal end, there is typically provided a bearing surface which cooperates with the clamp distal end, or stated otherwise, the clamped cord is in an interposed position between the bearing surface and the clamp distal end and pressure applied from opposite sides against the cord.

While generally satisfactory, it is desirable to dispense with the requirement of a bearing surface because of the space it occupies, and particularly is this so when opposite ends of a cord are clamped together to form a useful closed loop for a connecting function and, according to present practice, this would require two bearing surfaces, i.e. one for each clamp distal end.

Broadly, it is an object of the present invention to provide a clamp for forming a closed loop of an elastic cord overcoming the foregoing and other shortcomings of the prior art.

More particularly, it is an object to apply adequate clamping pressure to opposite ends of an elastic cord, thus achieving a closed loop configuration, with a nominal space requirement of a cooperating bearing surface, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
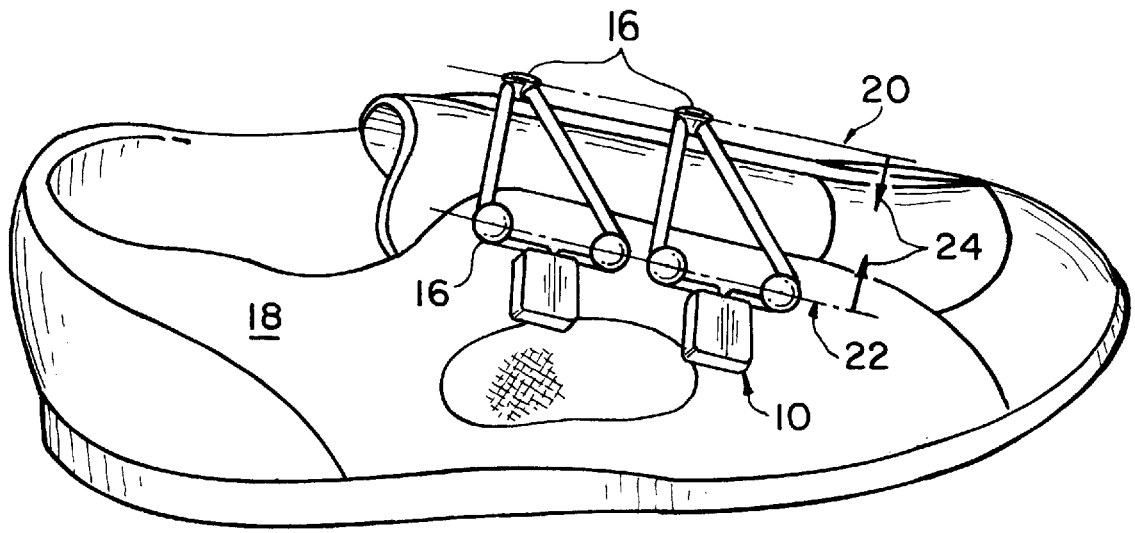
FIG. 1 is a perspective view of a typical end use of the within inventive article of manufacture.

Because of its utility, there is a need for an article of manufacture, herein generally designed 10, which presents a closed loop 12 of a cord 14 of an elastic construction material that can be disposed, as illustrated in FIG. 1, with the closed loop 12 in encircling relation about spaced apart objects, individually and collectively designated 16, in this case being studs of a sneaker 18, so as to be effective in permitting the urgency of the closed loop to urge the opposite facing stud rows 20 and 22 in closing movement 24 towards each other, and thus facilitating the taking off and putting on of the sneaker 18. While the sneaker 18 illustrates a primary use, the within article of manufacture 10, which functionally is aptly characterized as a connector, is also useful in interconnecting a stud-equivalent on a backpack to a stud-equivalent on the backpack closure flap, and thus using to advantage the urgency of the elastic cord 14 closed looped about spaced apart objects, to permit limited opening and closing degrees of movement in the spaced apart objects.

Connector 10, as already noted, has a length of elastic cord 14 of a selected diameter 28 that is held at opposite ends 30 and 32 in the closed loop configuration 34 by a body 36, which also serves as a finger grip facilitating the placement and removal of the encircling loop 12 at a site of use.

Figures 2, 4:
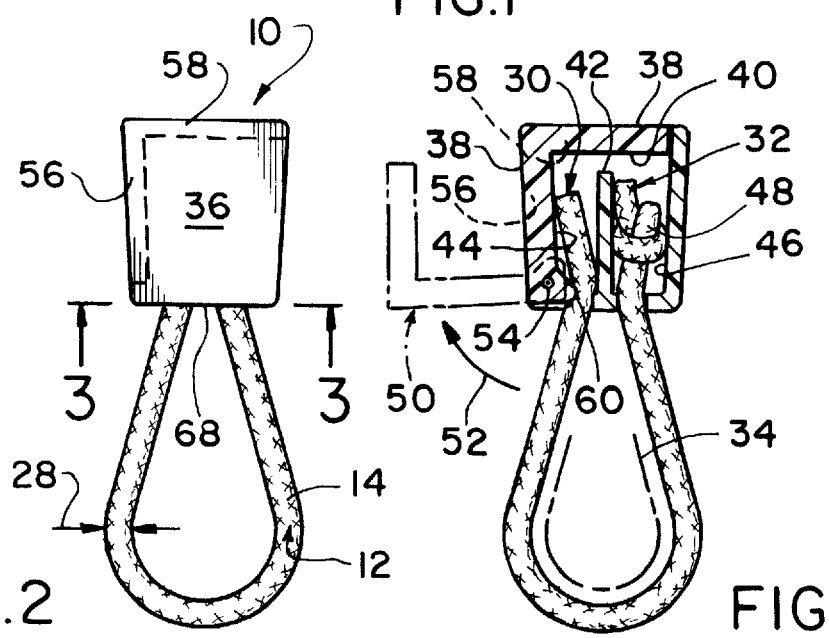
FIG. 2 is an isolated top plan view thereof.
FIG. 4 is a cross sectional view as taken along line 4—4 of FIG. 3.

Body 36 has external walls 38 which cooperate to bound a main internal compartment 40 that is subdivided by a medial wall 42, which it will be understood is of nominal thickness so as not to take up too much of the size of compartment 40, into first and second auxiliary compartments 44 and 46, with each end 30 and end 32 of the cord 14 being respectively disposed in auxiliary compartment 44 and auxiliary compartment 46, and the cord length portion between the ends 30 and 32 forming the closed loop 12. As best illustrated in FIG. 4, cord end 32 in its compartment 46 is knotted, as at 48, and is positioned on one side of the medial wall 42, and the other unknotted cord end 30 on the opposite side. An L-shaped side and top wall 50 mounted for a pivotal traverse 52 about a pivot 54 is effective to be manually moved from a clearance position depicted in phantom perspective through the pivotal traverse 52 into a full line position closing a side 56 and top 58 of the body 36.

Figures 3, 5:
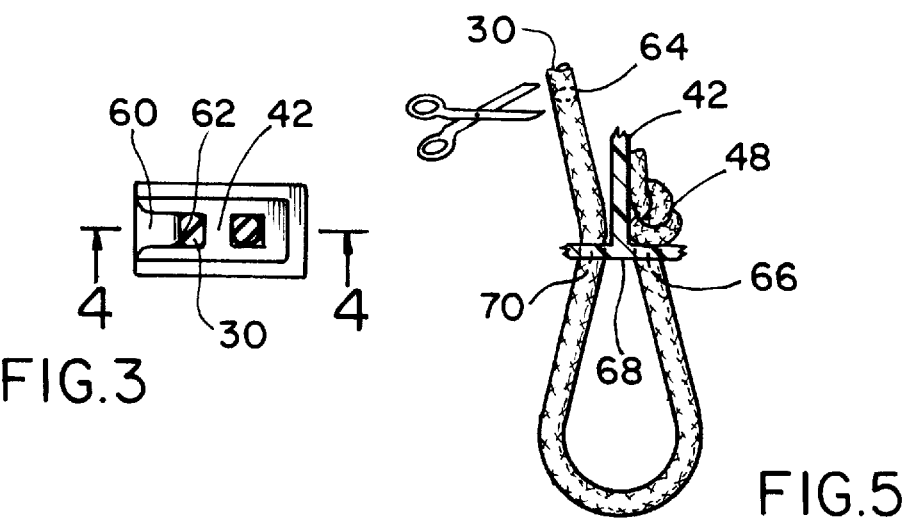
FIG. 3 is a cross sectional end view thereof as taken and seen in the direction of the arrows 3—3 of FIG. 2.
FIG. 5 is a simplified partial view of the structure illustrated in FIG. 4.

As best understood from FIGS. 3 and 4, on the side length portion or leg of wall 38 of the L-shape 50 is a clamping projection 60 which is urged into a holding contact, as at 62, against the cord end 30, the force of which contact being understood to be of an extent sufficient to urge the central or medial wall 42 in the direction of the force, and thus against the cord end 32.

Underlying the present invention is the recognition that movement of the wall 42 under the clamping force as might cause, from repeated use, a rupturing of the wall 42, that this consequence is prevented by the limiting of the extent of the wall movement by the bulk or knot 48 of the cord end 32, which knot also prevents inadvertent loosening of the connector 10 from the cord. The repeated use of removing and restoring the clamping force to the cord end 30 is to enable size adjustments in the closed loop 12, wherein cord end 30 is cut to size, as diagrammatically illustrated at 64, to correspondingly assume a size in the closed loop 12 appropriate for the end use.

For completeness sake, it is noted that the cord 14 that is cut to size is knotted at 48 and threaded through the top opening 56 into the auxiliary compartment 46 until it seats in a smaller diameter opening 66 in a bottom wall 68, and the other cord end 30 inserted into the auxiliary compartment 44 through another bottom wall opening 70, and the inserted length portion of the cord 14 clamped in place, at 62, as previously described.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A connector of a type having a closed loop of an elastic cord construction material and an operative position of said closed loop in encircling relation about spaced apart objects, said connector comprising a body having external walls bounding a main internal compartment, a medial wall of nominal thickness disposed centrally of said main compartment to delineate first and second auxiliary compartments on opposite sides of said medial wall, a length of said elastic cord having first and second opposite ends, said elastic cord first and second ends disposed, respectively, in said first and second auxiliary compartments with said length of said elastic cord configured into a closed loop in spanning relation between said first and second ends, and a pivotally mounted crank means on said body adapted to partake of a pivotal traverse from a clearance position into a position exerting a holding fence against said elastic cord first end in said first auxiliary compartment of an extent sufficient to urge said central wall in movement into contact with said second end of said elastic cord in said second auxiliary compartment, whereby a bulk of said second end of said elastic cord limits said movement of said central wall as might result in a rupturing thereof.

2. A connector as claimed in claim 1 wherein said bulk is a knotted end of said elastic cord.

* * * * *